United States Patent
Yu et al.

(10) Patent No.: US 9,526,105 B2
(45) Date of Patent: Dec. 20, 2016

(54) ENHANCED GSM CELL ACQUISITION

(71) Applicant: QUALCOMM Incorporated, San Diego, CA (US)

(72) Inventors: Zhi-Zhong Yu, Reading (GB); Bahadir Canpolat, Fleet (GB); Awnit Kumar, Reading (GB)

(73) Assignee: QUALCOMM Incorporated, San Diego, CA (US)

( * ) Notice: Subject to any disclaimer, the term of this patent is extended or adjusted under 35 U.S.C. 154(b) by 211 days.

(21) Appl. No.: 14/026,932

(22) Filed: Sep. 13, 2013

(65) Prior Publication Data

US 2014/0335873 A1 Nov. 13, 2014

Related U.S. Application Data

(60) Provisional application No. 61/822,751, filed on May 13, 2013.

(51) Int. Cl.
*H04W 72/00* (2009.01)
*H04W 72/04* (2009.01)
*H04W 48/16* (2009.01)
*H04W 88/06* (2009.01)

(52) U.S. Cl.
CPC ......... *H04W 72/0453* (2013.01); *H04W 48/16* (2013.01); *H04W 88/06* (2013.01)

(58) Field of Classification Search
CPC .......................... H04W 72/0453; H04W 48/16
USPC .......................................... 455/450; 370/338
See application file for complete search history.

(56) References Cited

U.S. PATENT DOCUMENTS

| | | | |
|---|---|---|---|
| 7,236,746 B2 | 6/2007 | Peric | |
| 7,444,150 B2 | 10/2008 | Rick et al. | |
| 7,796,987 B2 | 9/2010 | Tran et al. | |
| 2007/0123268 A1* | 5/2007 | Parata | 455/456.1 |
| 2007/0189259 A1 | 8/2007 | Sollenberger et al. | |
| 2011/0117911 A1* | 5/2011 | Narang et al. | 455/434 |
| 2012/0270537 A1 | 10/2012 | Weng et al. | |
| 2013/0029663 A1 | 1/2013 | Narang et al. | |

(Continued)

FOREIGN PATENT DOCUMENTS

| | | |
|---|---|---|
| EP | 2091197 A1 | 8/2009 |
| EP | 2184938 A1 | 5/2010 |

(Continued)

OTHER PUBLICATIONS

International Search Report and Written Opinion—PCT/US2014/035722—ISA/EPO—Oct. 16, 2014.

*Primary Examiner* — Marcos Batista
(74) *Attorney, Agent, or Firm* — Austin Rapp & Hardman

(57) ABSTRACT

Embodiments of the present invention include devices, systems and methods for prevention of dropped calls. For example, a method for wireless communication is described. A wireless communication device begins an acquisition. A scan of absolute radio frequency channel numbers for supported bands is performed using a wideband receiver. The absolute radio frequency channel numbers that include a frequency correction channel are identified. A synchronization channel is decoded using data corresponding to the identified one or more frequency correction channels. Other aspects, embodiments, and features are also claimed and described.

30 Claims, 13 Drawing Sheets

(56) References Cited

U.S. PATENT DOCUMENTS

2014/0057624 A1* 2/2014 Murgan ............... H04B 1/7087
 455/422.1

FOREIGN PATENT DOCUMENTS

EP 2645782 A1 10/2013
WO 0031998 A1 6/2000

* cited by examiner

ENHANCED GSM CELL ACQUISITION

RELATED APPLICATION AND PRIORITY CLAIM

This application is related to and claims priority to U.S. Provisional Patent Application Ser. No. 61/822,751, filed May 13, 2013, for "ENHANCED GSM CELL ACQUISITION" which is incorporated herein by reference as if fully set forth below and for all applicable purposes.

TECHNICAL FIELD

The technology discussed below relates generally to communication systems, and more specifically, to systems and methods for enhanced Global System for Mobile Communications (GSM) cell acquisition. Improved acquisition time enables and provides efficient use of limited power resources.

BACKGROUND

Wireless communication systems have become an important means by which many people worldwide have come to communicate. A wireless communication system may provide communication for a number of wireless communication devices, each of which may be serviced by a base station.

Users of wireless communication devices desire that their devices have many features. For example, a user may expect to power on a wireless communication device and immediately make or receive a phone call. But, wireless communication devices must perform initial acquisition and camp on procedures before service can be obtained and wireless communications can be established. Those procedures may need to be performed at power on and whenever a wireless communication device leaves a service area and then returns to a service area. These procedures may require considerable amounts of time before a user can make a phone call. Benefits may be realized by decreasing the amount of time needed for acquisition and camp on procedures.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

A method for wireless communication is described. The method includes beginning an acquisition. A scan of absolute radio frequency channel numbers for supported bands is performed using a wideband receiver. The absolute radio frequency channel numbers that include a frequency correction channel are identified. A synchronization channel is decoded using data corresponding to the identified frequency correction channels.

The method may be performed by a multi-mode wireless communication device. Multiple scans may be performed simultaneously using multiple local oscillators. The supported bands may include one or more of an EGSM band, a GSM-850 band, a personal communications service band, a digital cellular service band, a PGSM band, an RGSM band, a GSM 450 band, a GSM 480 band, a GSM 700 band and a T-GSM810 band.

A serving cell may be acquired using the synchronization channel. The wideband receiver may be a Long Term Evolution wideband receiver, a wireless fidelity wideband receiver or a wideband channel division multiple access wideband receiver. A fast Fourier transform may be used to identify frequency correction channels in scanned absolute radio frequency channel numbers.

A received signal strength indication of a broadcast control channel may be obtained for each absolute radio frequency channel number using the identified frequency correction channels. A time of the synchronization channel for each absolute radio frequency channel number may be obtained using data of a known period away from the identified frequency correction channels in the same wideband scanning data.

The identified frequency correction channels may be sorted according to received signal strength indication. The synchronization channel corresponding to the absolute radio frequency channel number that includes the frequency correction channel with a highest received signal strength indication may be decoded first.

A right section of captured IQ data of a selected absolute radio frequency channel number may be put to normal format of a baseband signal of a synchronization channel. A narrowband filter may be applied to obtain a clean synchronization signal. The scan may be performed across supported bands for multiple radio access technologies.

An apparatus for wireless communication is also described. The apparatus includes a processor, memory in electronic communication with the processor and instructions stored in the memory. The instructions are executable by the processor to begin an acquisition. The instructions are also executable by the processor to perform a scan of absolute radio frequency channel numbers for supported bands using a wideband receiver. The instructions are further executable by the processor to identify the absolute radio frequency channel numbers that include a frequency correction channel. The instructions are also executable by the processor to decode a synchronization channel using data corresponding to the identified frequency correction channels.

A wireless device is described. The wireless device includes means for beginning an acquisition. The wireless device also includes means for performing a scan of absolute radio frequency channel numbers for supported bands using a wideband receiver. The wireless device further includes means for identifying the absolute radio frequency channel numbers that include a frequency correction channel. The wireless device also includes means for decoding a synchronization channel using data corresponding to the identified frequency correction channels.

A computer-program product for wireless communications is also described. The computer-program product includes a non-transitory computer-readable medium having instructions thereon. The instructions include code for causing a wireless communication device to begin an acquisition. The instructions also include code for causing the wireless communication device to perform a scan of absolute radio frequency channel numbers for supported bands using a wideband receiver. The instructions further include code for causing the wireless communication device to identify the absolute radio frequency channel numbers that include a frequency correction channel. The instructions also include code for causing the wireless communication device to decode a synchronization channel using data corresponding to the identified frequency correction channels.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
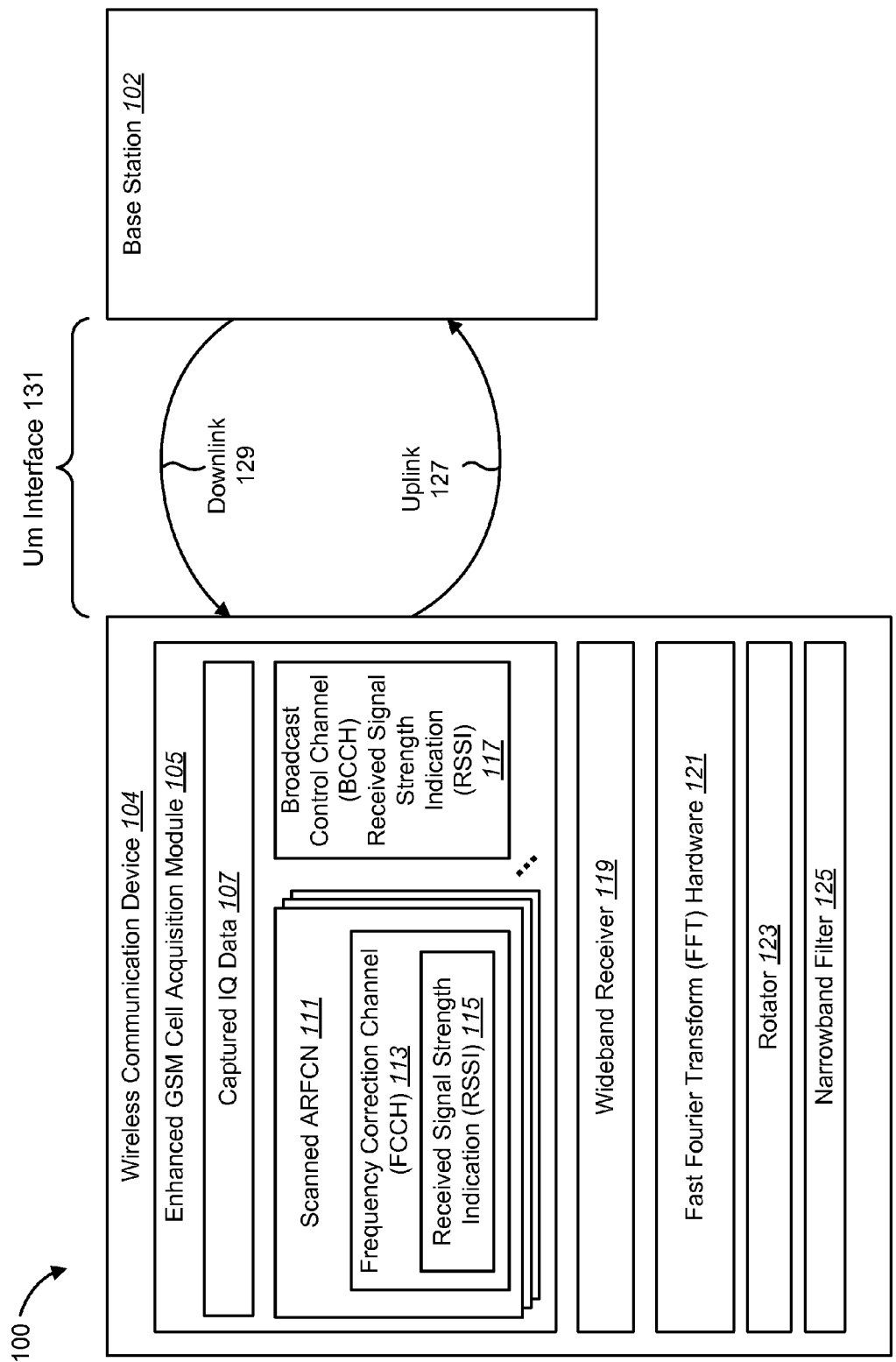
FIG. 1 shows a wireless communication system with multiple wireless devices according to some embodiments.

FIG. 1 shows a wireless communication system 100 with multiple wireless devices according to some embodiments. Wireless communication systems 100 are widely deployed to provide various types of communication content such as voice, data and so on. A wireless device may be a base station 102 or a wireless communication device 104. The wireless communication device 104 may be configured for enhanced GSM cell acquisition. For example, the wireless communication device 104 may be configured to search across multiple radio access technologies (RATs) and/or multiple bands quickly to obtain a serving cell.

A base station 102 is a station that communicates with one or more wireless communication devices 104. A base station 102 may also be referred to as, and may include some or all of the functionality of, an access point, base transceiver station (BTS), a broadcast transmitter, a NodeB, an evolved NodeB, etc. The term "base station" will be used herein. Each base station 102 provides communication coverage for a particular geographic area. A base station 102 may provide communication coverage for one or more wireless communication devices 104. The term "cell" can refer to a base station 102 and/or its coverage area depending on the context in which the term is used.

Communications in a wireless communication system 100 (e.g., a multiple-access system) may be achieved through transmissions over a wireless link. Such a communication link may be established via a single-input and single-output (SISO), multiple-input and single-output (MISO) or a multiple-input and multiple-output (MIMO) system. A MIMO system includes transmitter(s) and receiver(s) equipped, respectively, with multiple ($N_T$) transmit antennas and multiple ($N_R$) receive antennas for data transmission. SISO and MISO systems are particular instances of a MIMO system. The MIMO system can provide improved performance (e.g., higher throughput, greater capacity or improved reliability) if the additional dimensionalities created by the multiple transmit and receive antennas are utilized.

The wireless communication system 100 may utilize MIMO. A MIMO system may support both time division duplex (TDD) and frequency division duplex (FDD) systems. In a TDD system, uplink and downlink transmissions are in the same frequency region so that the reciprocity principle allows the estimation of the downlink channel from the uplink channel. This enables a transmitting wireless device to extract transmit beamforming gain from communications received by the transmitting wireless device.

The wireless communication system 100 may be a multiple-access system capable of supporting communication with multiple wireless communication devices 104 by sharing the available system resources (e.g., bandwidth and transmit power). Examples of such multiple-access systems include code division multiple access (CDMA) systems, wideband code division multiple access (WCDMA) systems, time division multiple access (TDMA) systems, frequency division multiple access (FDMA) systems, orthogonal frequency division multiple access (OFDMA) systems, single-carrier frequency division multiple access (SC-FDMA) systems, $3^{rd}$ Generation Partnership Project (3GPP) Long Term Evolution (LTE) systems and spatial division multiple access (SDMA) systems.

The terms "networks" and "systems" are often used interchangeably. A CDMA network may implement a radio technology such as Universal Terrestrial Radio Access (UTRA), cdma2000, etc. UTRA includes WCDMA and Low Chip Rate (LCR) while cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDMA, etc. UTRA, E-UTRA and GSM are part of Universal Mobile Telecommunication System (UMTS). Long Term Evolution (LTE) is a release of UMTS that uses E-UTRA. UTRA, E-UTRA, GSM, UMTS and Long Term Evolution (LTE) are described in documents from an organization named "3rd Generation Partnership Project" (3GPP). cdma2000 is described in documents from an organization named "3rd Generation Partnership Project 2" (3GPP2).

The $3^{rd}$ Generation Partnership Project (3GPP) is a collaboration between groups of telecommunications associations that aims to define a globally applicable $3^{rd}$ generation (3G) mobile phone specification. 3GPP Long Term Evolution (LTE) is a 3GPP project aimed at improving the Universal Mobile Telecommunications System (UMTS) mobile phone standard. The 3GPP may define specifications for the next generation of mobile networks, mobile systems and mobile devices.

In 3GPP Long Term Evolution (LTE), a wireless communication device 104 may be referred to as a "user equipment" (UE). A wireless communication device 104 may also be referred to as, and may include some or all of the functionality of, a terminal, an access terminal, a subscriber unit, a station, etc. A wireless communication device 104 may be a cellular phone, a personal digital assistant (PDA), a wireless device, a wireless modem, a handheld device, a laptop computer, etc.

A wireless communication device 104 may communicate with zero, one or multiple base stations 102 on the downlink 129 and/or uplink 127 at any given moment. The downlink 129 (or forward link) refers to the communication link from a base station 102 to a wireless communication device 104, and the uplink 127 (or reverse link) refers to the communication link from a wireless communication device 104 to a base station 102. A wireless communication device 104 may be configured to use Global System for Mobile Communications (GSM), Long Term Evolution (LTE), wireless fidelity (Wi-Fi) and wideband CDMA.

The Global System for Mobile Communications (GSM) is a widespread standard in cellular, wireless communication. GSM is relatively efficient for standard voice services. However, high-fidelity audio and data services require higher data throughput rates than that for which GSM is optimized. To increase capacity, the General Packet Radio Service (GPRS), EDGE (Enhanced Data rates for GSM Evolution) and UMTS (Universal Mobile Telecommunications System) standards have been adopted in GSM systems. In the GSM/EDGE Radio Access Network (GERAN) specification, GPRS and enhanced general packet radio service (EGPRS) provide data services. The standards for GERAN are maintained by the 3GPP (Third Generation Partnership Project). GERAN is a part of GSM. More specifically, GERAN is the radio part of GSM/EDGE together with the network that joins the base stations 102 (the Ater and Abis interfaces) and the base station controllers (A interfaces, etc.). GERAN represents the core of a GSM network. It routes phone calls and packet data from and to the PSTN (Public Switched Telephone Network) and Internet to and from remote terminals. GERAN is also a part of combined UMTS/GSM networks.

GSM employs a combination of Time Division Multiple Access (TDMA) and Frequency Division Multiple Access (FDMA) for the purpose of sharing the spectrum resource. GSM networks typically operate in a number of frequency bands. For example, a GSM network may use the GSM-850 band, the EGSM band (also referred to as the E-GSM-900 band), the DCS (digital cellular service) band (also referred to as DCS-1800), the PCS (personal communications service) band (also referred to as PCS-1900), the P-GSM band, the R-GSM band and the T-GSM band. Due to refarming, many additional GSM bands may also be employed that have not yet been defined.

The GSM-850 band commonly may use a radio spectrum in the 824.2-849.2 megahertz (MHz) frequency range for uplink 127 and the 869.2-894.2 MHz frequency range for downlink 129. The EGSM band may use a radio spectrum in the 880-915 MHz frequency range for uplink 127 and the 925-960 MHz frequency range for downlink 129. The DCS band may use a radio spectrum in the 1710.2-1784.8 MHz frequency range for uplink 127 and the 1805.2-1879.8 MHz frequency range for downlink 129. The PCS band may use a radio spectrum in the 1850.2-1909.8 MHz frequency range for uplink 127 and the 1930.2-1989.8 MHz frequency range for downlink 129.

Each frequency band may be divided into 200 kilohertz (kHz) carrier frequencies providing 124 RF channels spaced at 200 kHz. GSM-1900 uses the 1850-1910 MHz bands for the uplink 127 and 1930-1990 MHz bands for the downlink 129. Like GSM-900, FDMA divides the spectrum for both uplink 127 and downlink 129 into 200 kHz-wide carrier frequencies. Similarly, GSM-850 uses the 824-849 MHz bands for the uplink 127 and 869-894 MHz bands for the downlink 129, while GSM-1800 uses the 1710-1785 MHz bands for the uplink 127 and 1805-1880 MHz bands for the downlink 129.

Each channel in GSM is identified by a specific absolute radio frequency channel number (ARFCN). For example, ARFCN 1-124 are assigned to the channels of GSM-900, ARFCN 128-251 are assigned to the channels of GSM-850, ARFCN 0-123 and 975-1023 are assigned to EGSM and ARFCN 512-885 are assigned to DCS and PCS. In one configuration, DCS may include the ARFCNs 512-888 while PCS includes the ARFCNs 512-810. Although the PCS band and the DCS band shared some common ARFCNs, the shared ARFCNs are mapped to different carrier frequencies (and in general, the PCS band and the DCS band do not co-exist). In GSM, each channel may have a channel width of 200 kHz. Thus, the EGSM band has 175 channels, the DCS band has 375 channels, the PCS band has 300 channels and the GSM-850 band has 125 channels.

Before registering with a subscribed network, a wireless communication device 104 may need to obtain a short list of possible cells that could serve as a serving cell. In one configuration, a wireless communication device 104 may include a database that records the previous serving cell, thereby speeding up registration. However, a database may not help in certain scenarios. For example, a wireless communication device 104 that is just turned on, a wireless communication device 104 that is experiencing coverage issues, a wireless communication device 104 returning to a well-covered area, a new wireless communication device 104 on startup, a wireless communication device 104 with newly reimaged software, a wireless communication device 104 that is taken to a different country, a different region or another cell, a wireless communication device 104 that has just received a subscription identity module (SIM) card from another mobile network operator (MNO), a multimode wireless communication device 104 that needs to scan over multiple radio access technologies (RATs), and a wireless communication device 104 that is moving will be unable to use a database with the previous serving cell to speed up registration. When the database solution is not available, the wireless communication device 104 may instead scan the ARFCNs.

Scanning the ARFCNs allows the wireless communication device 104 to determine the possible cells that can act as the serving cell. Specifically, the wireless communication device 104 may scan the ARFCNs to find a frequency correction channel (FCCH) 113. The FCCH 113 is a downlink-only control channel in the GSM Um air interface 131 that enables the wireless communication device 104 to lock a local oscillator (LO) to the base station 102 clock. The FCCH 113 is transmitted in frames immediately before the synchronization channel (SCH). Thus, once a wireless communication device 104 has found the FCCH 113, the wireless communication device 104 can then find and decode the SCH.

Scanning the ARFCNs may require considerable amounts of time. This time period can be referred to as the cell acquisition (ACQ) time. The cell ACQ time can be the amount of time required to find all broadcast control channels (BCCHs) of all radio access technologies (RATs). A wireless communication device 104 may need to perform a power scan on each and every band/mode that the wireless communication device 104 can operate on. With the introduction of GSM spectrum refarming, a wireless communication device 104 may spend additional time searching other radio access technologies (RATs) in addition to GSM, such as WCDMA, CDMA/EV-DO and LTE.

Within the four popular bands for GSM (the GSM-850 band, the EGSM band, the DCS band and the PCS band), a wireless communication device 104 may need to scan 975 ARFCNs. One problem is that GSM is a narrowband system, where the conventional method is to scan each ARFCN one by one. For example, a wireless communication device 104 may spend 10-20 seconds scanning the ARFCNs before the wireless communication device 104 can register with the subscribed network. Furthermore, as wireless communication devices 104 become more sophisticated, additional time spent scanning ARFCNs may be required (due to additional supported bands and additional supported radio access technologies (RATs)).

Typically, a radio resource (RR) management entity may tell layer 1 to scan the 975 ARFCNs in the four popular GSM bands (i.e., the EGSM band, the GSM-850 band, the DCS band and the PCS band). The layer 1 may report back a sorted list of ARFCNs, with the ARFCNs listed from highest power to lowest power (there may be over one hundred ARFCNs scanned). The radio resource (RR) management entity may then request the layer 1 to try and find the FCCH 113 in the top ARFCNs. The FCCH 113 is a burst with a tone of 67 kHz that happens approximately every 50 milliseconds (ms) on the BCCH ARFCN. Thus, a GSM wireless communication device 104 may need to wait 50 ms on every channel with received power to determine whether the channel is a BCCH. This is wasteful, since most channels are traffic channels (TCHs) and not BCCHs.

Out-of-service (OOS) is common in telecommunications for both power on and normal usage. This is because it is not yet possible to provide universal coverage. Furthermore, searching for coverage uses battery power. If not carefully considered, the ACQ time may drain the battery, resulting in an unusable wireless communication device 104. Thus, operators are interested in an efficient way of handling out-of-service (OOS). Typically, a reasonable periodic search is used to obtain cell coverage. The period could be as long as multiple minutes when service has not been found for a long period of time.

The wireless communication device 104 may include an enhanced GSM cell acquisition module 105. The enhanced GSM cell acquisition module 105 may decrease the amount of time required for the wireless communication device 104 to register with a subscribed network. More specifically, the enhanced GSM cell acquisition module 105 makes use of the multi-mode capabilities of wireless communication devices 104.

In multi-mode wireless communication devices 104, GSM is typically used as the baseline, with support added for other wideband radio access technologies (RATs). These other RATs can include WCDMA, LTE and/or variants thereof.

According to some embodiments, a multi-mode wireless communication device 104 may include a hardware foundation for using the enhanced GSM cell acquisition module 105. For example, a multi-mode wireless communication device 104 may include a wideband receiver 119. The wideband receiver 119 may be a Long Term Evolution (LTE) wideband receiver 119, a Wi-Fi wideband receiver 119 or a WCDMA wideband receiver 119. In one configuration, the wideband receiver 119 may be a 20 MHz wideband receiver 119.

A multi-mode wireless communication device 104 can also include other components and features. For example, the wireless communication device 104 may include fast Fourier transform (FFT) hardware 121, a rotator 123 and a narrowband filter 125. The fast Fourier transform (FFT) hardware 121 may be used to identify FCCHs 113 in scanned ARFCNs 111. The rotator 123 may be used to place the right section of captured IQ data 107 of an ARFCN 111 to the normal format of a baseband signal of an SCH. The narrowband filter 125 may be used to obtain a clean SCH signal.

The wideband receiver 119 can be utilized to scan 200 ARFCNs every 52 milliseconds (ms) (which is considerably less than power scans). The scan 200 may also be referred to as a carrier scan or a tone scan. Thus, the wideband receiver 119 can scan the 175 ARFCNs in the EGSM band using one scan (52 ms). The wideband receiver 119 can also scan the 125 ARFCNs in the GSM-850 band using one scan (52 ms). A scan of 52 ms covers all possible FCCH 113 appearances in the 200 ARFCNs scanned.

Both the DCS band and the PCS band include more than 200 ARFCNs (DCS has 375 ARFCNs and PCS has 300 ARFCNs). Thus, the DCS band and the PCS band may each require two scans by the wideband receiver 119. However, if two or more local oscillators (LOs) are used, the wideband receiver 119 can scan the DCS band in one scan (52 ms), the PCS band in one scan (52 ms), and both the GSM-850 band and the EGSM band in one scan (52 ms). The wideband receiver 119 can therefore scan all four bands in 156 ms. Each of the local oscillators (LOs) may have options for different bandwidths and central frequencies that are suitable for the scanned bands (e.g., the GSM bands). In one configuration, each local oscillator (LO) may be configured such that the band is covered while minimizing overlapping with other bands. When extreme dynamic range is needed, the different bandwidths used by Long Term Evolution (LTE) may be used to ensure that the proper serving cell is distinguishable from other cells. Using narrower bands may then be employed to avoid the nearby cells that generate interference with signals from the serving cell. In some configurations, the multiple local oscillators (LOs) may be configured to scan the ARFCNs in a parallel arrangement.

Once the supported bands have been scanned, the wireless communication device 104 may use the fast Fourier transform (FFT) hardware 121 to identify any FCCHs 113 in the scanned ARFCNs 111. The fast Fourier transform (FFT) hardware 121 is then able to determine the ARFCNs 111 of the FCCHs 113, the received signal strength indication (RSSI) 117 of the BCCH and the time of the SCH. The enhanced GSM cell acquisition module may sort the FCCHs 113 according to their received signal strength indication (RSSI) 115. The wireless communication device 104 may then decode the SCH of the FCCH 113 with the highest received signal strength indication (RSSI) using the same captured IQ data. System information blocks SI 3/4 may be in a predictable location. Once the FCCH 113 and SCH are found, SI 3/4 may be grouped together and also obtained using the wideband receiver 119.

The use of automatic gain control (AGC) may ensure no saturation happens to the signal in the sampling bandwidth. In a best case scenario, the cell with the highest power level is the user's public land mobile network (PLMN). However in most cases, depending on the location of the wireless communication device 104 to the prospective serving cells, the power level may be good enough to be accommodated by the automatic gain control (AGC) settings, and the prospective serving cells are identified correctly. For some corner cases, the power levels from prospective serving cells of the wireless communication device 104 are too low to be accommodated in the limited dynamic range of the automatic gain control (AGC) (which are primarily set to avoid saturation), and the 20 MHz ACQ may not find any suitable prospective serving cells.

When there are high power levels above −48 dBm, the wireless communication device 104 can narrow down the wide band receiver 119 (LTE has 6 different BW: 20, 15, 10, 5, 3 and 1.4 MHz) and park the local oscillator (LO) suitably to resample the range of low power levels which had not shown any BCCH in the previous attempts. This can lead to a natural fall back to a conventional 200 kHz narrow band ACQ technique. This second scan and subsequent scans are aimed to obtain the FCCH 113 at −110 dBm of the desirable serving cells. The fall back procedures will only be used in corner cases and the enhanced GSM ACQ should be sufficient in most cases.

Figure 2:
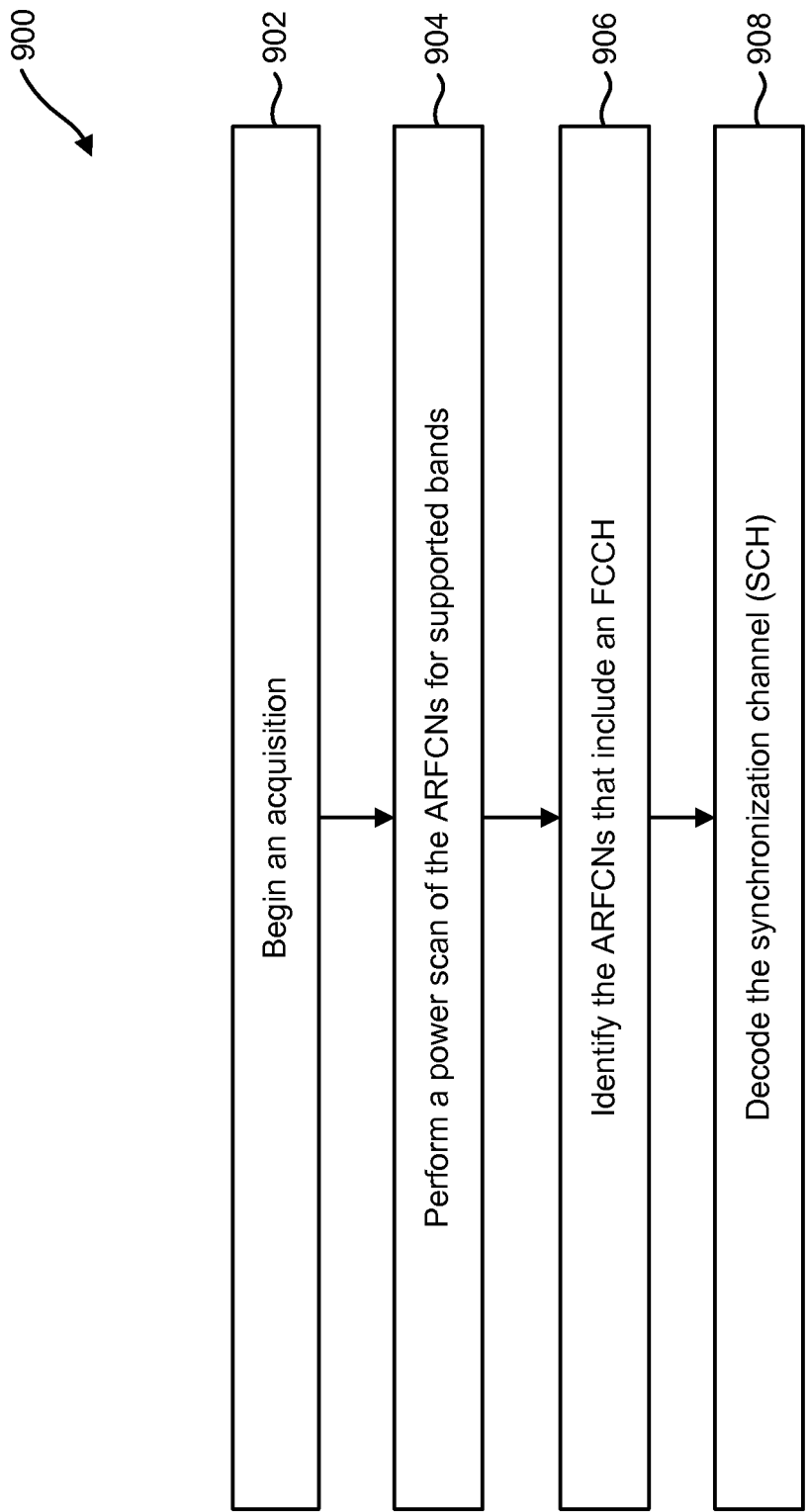
FIG. 2 is a flow diagram of a method for enhanced GSM cell acquisition according to some embodiments.

FIG. 2 is a flow diagram of a method 900 for enhanced GSM cell acquisition according to some embodiments. The method 900 may be performed by a wireless communication device 104. In one configuration, the wireless communication device 104 may be configured according to GSM standards. The wireless communication device 104 may be a multi-mode device capable of communicating using multiple bands and/or multiple radio access technologies (RATs). The wireless communication device 104 may thus include a wideband receiver 119 and fast Fourier transform (FFT) hardware 121 (as discussed above).

The wireless communication device 104 may begin 902 an acquisition. In one configuration, the wireless communication device 104 may begin 902 acquiring a serving cell using at least one of an antenna, a processor, and memory. The wireless communication device 104 may perform 904 a scan of the ARFCNs 111 for supported bands. As discussed above, the wireless communication device 104 may use a wideband receiver 119 to perform 904 the scan. The scan may be performed 904 across multiple bands and/or multiple radio access technologies (RATs).

The wireless communication device 104 may identify 906 the ARFCNs 111 of the scan that include an FCCH 113. Most ARFCNs 111 will be traffic channels. However, some of the ARFCNs 111 may be a BCCH. The BCCH data may include the cell ID, the location area code (LAC), the mobile network code (MNC) and the mobile country code (MCC). If the ARFCN 111 is a BCCH, the ARFCN 111 may include a 67 kHz tone (which is the FCCH 113) that is repeated approximately every 50 ms. Once the FCCH 113 is found, the next frame (4.6 ms later) will be the synchronization channel (SCH). The synchronization channel (SCH) may include information corresponding to a public land mobile network (PLMN) search and registration necessary for the wireless communication device 104 to start a call or camp on a serving cell. The wireless communication device 104 may then decode 908 the synchronization channel (SCH). In one configuration, the wireless communication device 104 may use data corresponding to the one or more identified FCCHs 113 to decode 908 the synchronization channel (SCH) (i.e., because the synchronization channel (SCH) immediately follows an FCCH 113). The wireless communication device 104 may decode 908 the synchronization channel (SCH) using at least one of an antenna, a processor and memory. The wireless communication device 104 may use the decoded synchronization channel (SCH) to acquire a serving cell.

Figure 3:
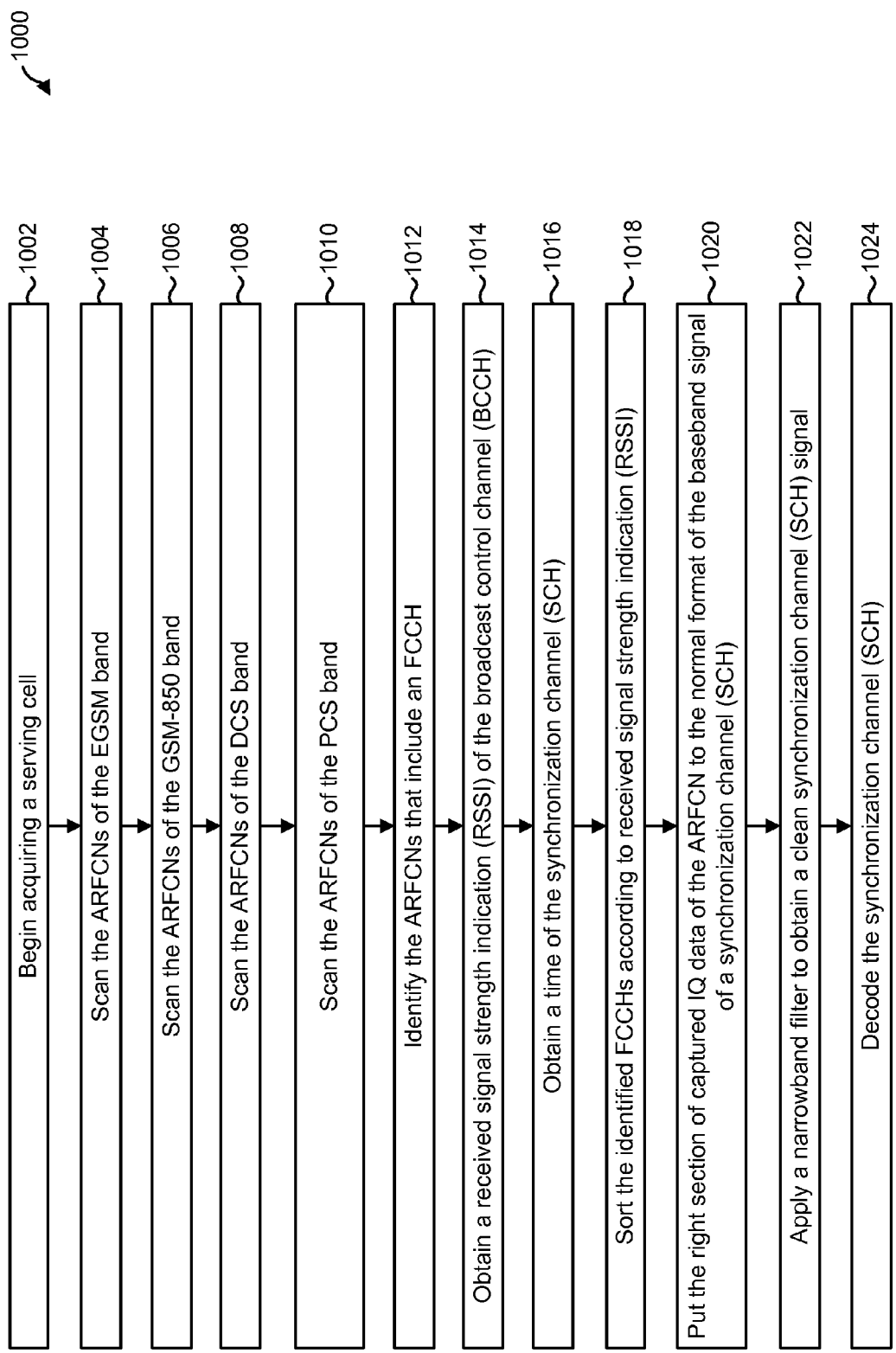
FIG. 3 is a flow diagram of a method for enhanced GSM cell acquisition according to some embodiments.

FIG. 3 is a flow diagram of a method 1000 for enhanced GSM cell acquisition according to some embodiments. The method 1000 may be performed by a wireless communication device 104. In one configuration, the wireless communication device 104 may be a quad-band GSM device that has no knowledge of the RF environment (e.g., the wireless communication device 104 has just been turned on). The wireless communication device 104 may support the EGSM band, the GSM-850 band, the PCS band and the DCS band.

Prior to placing a call, the wireless communication device 104 must acquire a serving cell. Therefore, the wireless communication device 104 may begin acquiring 1002 a serving cell as part of an acquisition. It may be desirable to reduce the amount of time that the wireless communication device 104 spends acquiring 1002 the serving cell (for example, many commercial wireless communication devices 104 may take 10-20 seconds registering with a serving cell before a call can be made). To reduce the amount of time that the wireless communication device 104 spends acquiring 1002 the serving cell, the wireless communication device 104 may use an enhanced GSM cell acquisition module 105.

The wireless communication device 104 may scan 1004 the ARFCNs 111 of the EGSM band. The wireless communication device 104 may also scan 1006 the ARFCNs 111 of the GSM-850 band. In one configuration, the wireless communication device 104 may scan the ARFCNs 111 of the EGSM band and the GSM-850 band using a wideband receiver 119. If the wireless communication device 104 is equipped with multiple local oscillators (LOs), the wideband receiver 119 may scan the EGSM band and the GSM-850 band at the same time (over a 52 ms period).

The wireless communication device 104 may scan 1008 the ARFCNs 111 of the DCS band. In one configuration, the wireless communication device 104 may scan 1008 the ARFCNs 111 of the DCS band using a wideband receiver 119. If the wireless communication device 104 is equipped with multiple local oscillators (LOs), the wideband receiver 119 may scan the 375 channels of the DCS band over a 52 ms period (i.e., two scans are performed simultaneously).

The wireless communication device 104 may also scan 1010 the ARFCNs 111 of the PCS band. In one configuration, the wireless communication device 104 may scan 1010 the ARFCNs 111 of the PCS band using a wideband receiver 119. If the wireless communication device 104 is equipped with multiple local oscillators (LOs), the wideband receiver 119 may scan 1010 the 300 channels of the PCS band over a 52 ms period (i.e., two scans are performed simultaneously).

The order of bands scanned is unimportant according to some embodiments. For example, in one configuration the wireless communication device 104 may scan the DCS band first, the EGSM band and GSM-850 band second and the PCS band third. In another configuration, the wireless communication device 104 may scan the PCS band first, the DCS band second and the EGSM band and GSM-850 band third. Furthermore, the wireless communication device 104 may support other bands than the DCS band, PCS band, EGSM band and GSM-850 band. For example, a wireless communication device 104 may support the GSM-710 band, the GSM-750 band or the T-GSM-900 band.

The wireless communication device 104 may identify 1012 the ARFCNs 111 that include an FCCH 113. In one configuration, the wireless communication device 104 may identify 1012 the ARFCNs 111 that include an FCCH 113 using fast Fourier transform (FFT) hardware 121. The wireless communication device 104 may also use the fast Fourier transform (FFT) hardware 121 to obtain 1014 a received signal strength indication (RSSI) 117 of the BCCH and to obtain 1016 a time of the SCH for each ARFCN 111 using data of a known period away from the identified FCCHs 113 in the same wideband scanning data. The wireless communication device 104 may then sort 1018 the identified FCCHs 113 according to the received signal strength indication (RSSI) 115 of each FCCH 113, which can be directly computed using the received FCCH 113 IQ samples by calculating the averaged squared power. In one configuration, the wireless communication device 104 may select the ARFCN 111 that includes an identified FCCH 113 with the highest received signal strength indication (RSSI) 115 as the selected ARFCN 111. The wireless communication device 104 may then decode a synchronization channel (SCH) on the selected ARFCN 111. If the wireless communication device 104 is unable to decode a synchronization channel (SCH) on the selected ARFCN 111, the wireless communication device 104 may select a next ARFCN 111 that includes an identified FCCH 113 with the next highest received signal strength indication (RSSI) 115 as the selected ARFCN 111. This may continue until the wireless communication device 104 is able to successfully decode the synchronization channel (SCH).

With the scanned ARFCNs 111 and the time of the identified FCCHs 113, the wireless communication device 104 can put 1020 the right section of captured IQ data 107 of the ARFCN 111 for SCH decoding. According to the 3GPP spec 45.0002, once the FCCH 113 timing is discovered, subsequent SCH frame boundaries can be determined because the SCH is located 10 TDMA frames after the end of the FCCH 113. Furthermore, any frequency offset detected while identifying the FCCH 113 may be compensated for by using a rotator 123 immediately before attempting to decode the SCH. The wireless communication device 104 can next apply 1022 a narrowband filter to obtain a clean SCH signal. The wireless communication device 104 can then decode 1024 the SCH. Multiple SCHs may be decoded using a single scan.

Some ARFCNs may not be used by GSM (e.g., the ARFCNs 975-1023 may not be used by GSM). Thus, the wireless communication device 104 may conserve power and reduce the time spent scanning by not scanning the ARFCNs 975-1023. Due to refarming, these ARFCNs may be used in the future by different technologies (which results in old methods wastefully using time to scan unused ARFCNs). The present systems and methods can scan a large number of ARFCNs at one time without performing a power scan, resulting in considerable power savings as refarming occurs. Out of all the found BCCHs, there may be different operators and different cells. Further PLMN searches from SI3/4 may also be found using the wideband receiver 119 over the 11 BCCHs (as the BCCHs are predictable in the same manner as the SCHs but with a 450 ms repetition period). Of the short listed BCCHs (i.e., the SCHs that lead to the Sis), there may be one BCCH for the wireless communication device 104 to camp on and the other BCCHs may be used as Ncells or other operator's BCCH.

By using an enhanced GSM cell acquisition module 105, the power spent scanning ARFCNs 111 may be reduced. Power savings occur because 200 ARFCNs 111 are scanned in each band rather than performing a power scan of the ARFCNs 111 one by one. If a detected cell is not GSM, the enhanced GSM cell acquisition module 105 may quickly identify this and switch to another radio access technology (RAT) without wasting time. In some scenarios, additional radio access technologies (RATs) will only add 100 ms to the waiting time rather than 10 seconds or more.

Using fast Fourier transform (FFT) hardware 121, software and/or firmware (for example, by partitioning the tasks and then having some tasks performed by hardware and some tasks performed by software) may be up to 200 times more efficient when performing an FCCH search than traditional methods. This can occur because each wideband scan will cover over 200 ARFCNs 111 in the same amount of time as the old GSM acquisition method for one ARFCN 111. Furthermore, the enhanced GSM cell acquisition module 105 may acquire all the FCCHs 113 and SCHs available, resulting in a more efficient way to form the Ncell reconfirm procedures. Finally, the enhanced GSM cell acquisition module 105 may provide quick serving cell discovery and registration, resulting in less down time experienced by a user before the wireless communication device 104 is able to make a call.

Figure 4:
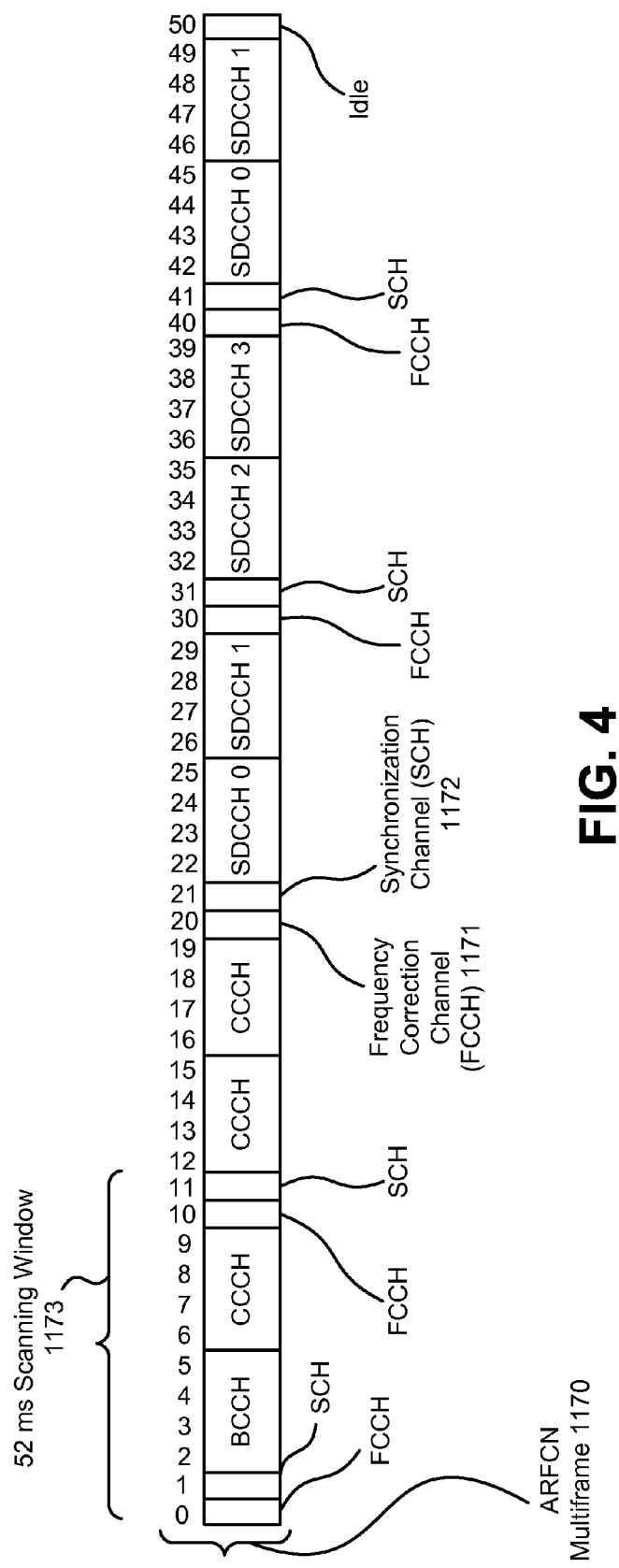
FIG. 4 illustrates an ARFCN multiframe according to some embodiments.

FIG. 4 illustrates an ARFCN multiframe 1170 according to some embodiments. The ARFCN multiframe 1170 may be from a scanned ARFCN 111 that is determined to include a frequency correction channel (FCCH) 1171. Because the ARFCN multiframe 1170 includes a frequency correction channel (FCCH) 1171, the ARFCN multiframe 1170 also includes a synchronization channel (SCH) 1172 that immediately follows the frequency correction channel (FCCH) 1171. As discussed above, a wireless communication device 104 may use fast Fourier transform (FFT) hardware 121 to identify which ARFCNs 111 include a frequency correction channel (FCCH) 1171, the received signal strength indication (RSSI) of the BCCH and the time of the synchronization channel (SCH) 1172. The ARFCN multiframe 1170 may also include other information, such as the broadcast control channel (BCCH), the common control channel (CCCH) and the stand-alone dedicated control channel (SDCCH).

Figure 5:
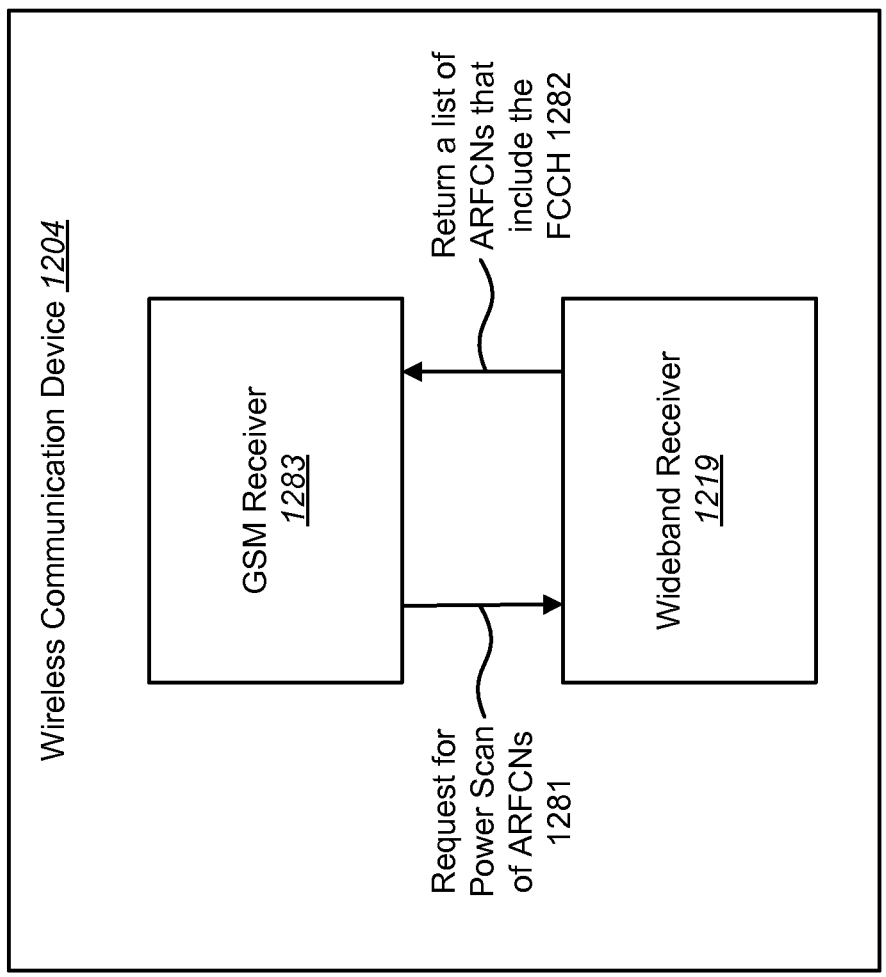
FIG. 5 is a block diagram illustrating a wireless communication device according to some embodiments.

FIG. 5 is a block diagram illustrating a wireless communication device 1204 according to some embodiments. The wireless communication device 1204 of FIG. 5 may be one configuration of the wireless communication device 104 of FIG. 1. The wireless communication device 1204 may include a GSM receiver 1283 and a wideband receiver 1219. Many modern wireless communication devices 1204 are configured as multi-mode devices, and may thus include both a GSM receiver 1283 and a wideband receiver 1219 (e.g., for use in LTE, Wi-Fi, or WCDMA). For typical GSM operations, the wideband receiver 1219 is not used. Benefits may be realized by using the wideband receiver 1219 to perform a scan of ARFCNs 111 for the GSM receiver 1283.

The GSM receiver 1283 may send a request 1281 for a scan of ARFCNs 111 to the wideband receiver 1219. For example, the GSM receiver 1283 may send the request 1281 to the wideband receiver 1219 on startup, after software has been reimaged, after the wireless communication device 1204 has been taken to a different country, region or cell, or after the wireless communication device 1204 has received a new SIM card. Upon receiving the request, the wideband receiver 1219 may perform a scan of the ARFCNs 111. For example, the wideband receiver 1219 may scan the ARFCNs 111 in the GSM-850 band, the EGSM band, the DCS band and the PCS band to determine which ARFCNs 111 include the FCCH 1171. The wideband receiver 1219 may then return 1282 a list of ARFCNs 111 that include the FCCH 1171 to the GSM receiver 1283. The GSM receiver 1283 may use the list of ARFCNs 111 that include the FCCH 1171 to obtain the synchronization channel (SCH) 1172 and thereby register with a subscriber network.

Figure 6:
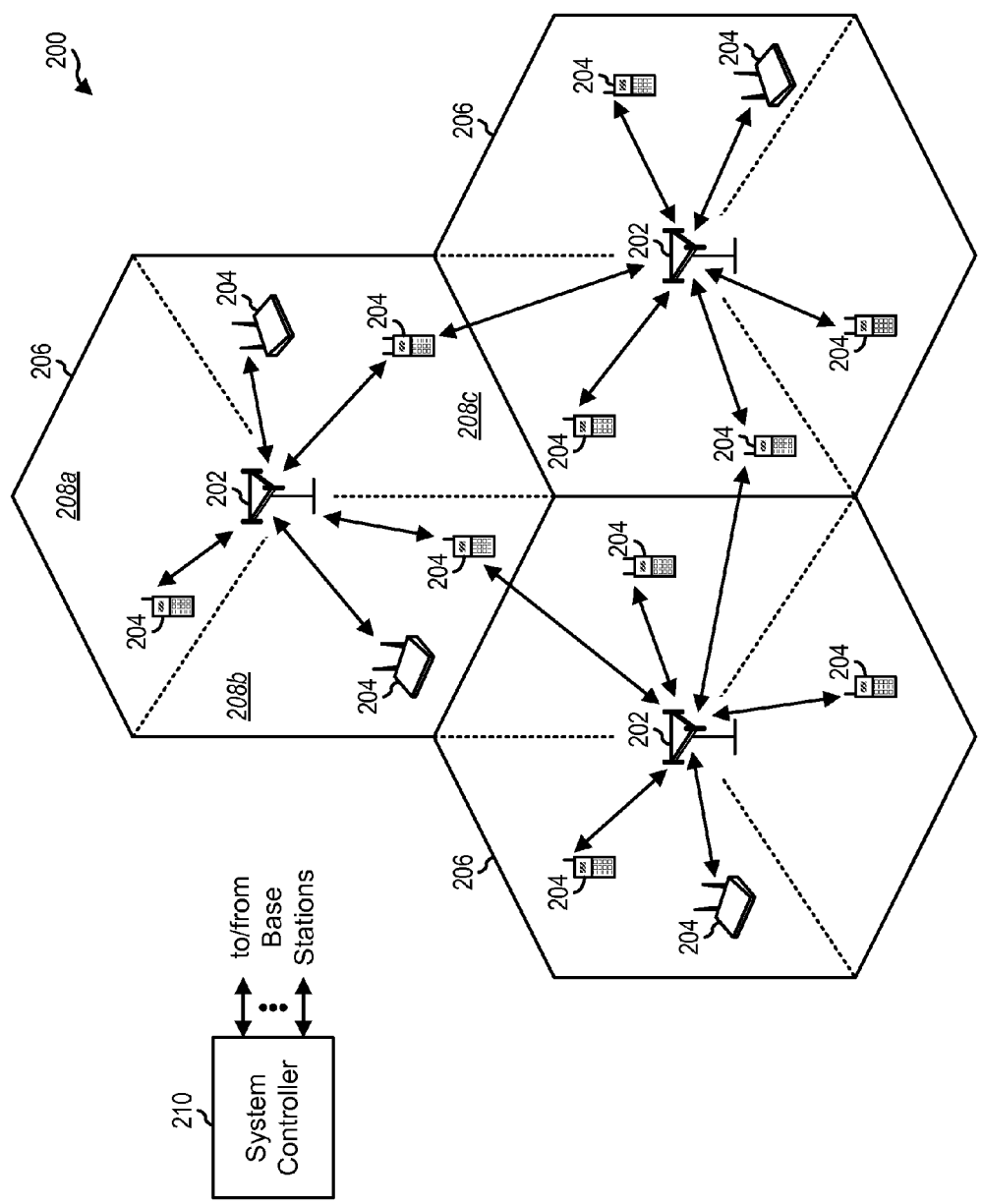
FIG. 6 shows an example of a wireless communication system according to some embodiments.

FIG. 6 shows an example of a wireless communication system 200 according to some embodiments. The wireless communication system 200 includes multiple base stations 202 and multiple wireless communication devices 204. Each base station 202 provides communication coverage for a particular geographic area 206.

To improve system capacity, a base station coverage area 206 may be partitioned into plural smaller areas, e.g., three smaller areas 208a, 208b, and 208c. Each smaller area 208a, 208b, 208c may be served by a respective base transceiver station (BTS). The term "sector" can refer to a BTS and/or its coverage area 208 depending on the context in which the term is used. For a sectorized cell, the BTSs for all sectors of that cell are typically co-located within the base station 202 for the cell.

Wireless communication devices 204 are typically dispersed throughout the wireless communication system 200. For a centralized architecture, a system controller 210 may couple to the base stations 202 and provide coordination and control for the base stations 202. The system controller 210 may be a single network entity or a collection of network entities. As another example, for a distributed architecture, base stations 202 may communicate with one another as needed.

Figure 7:
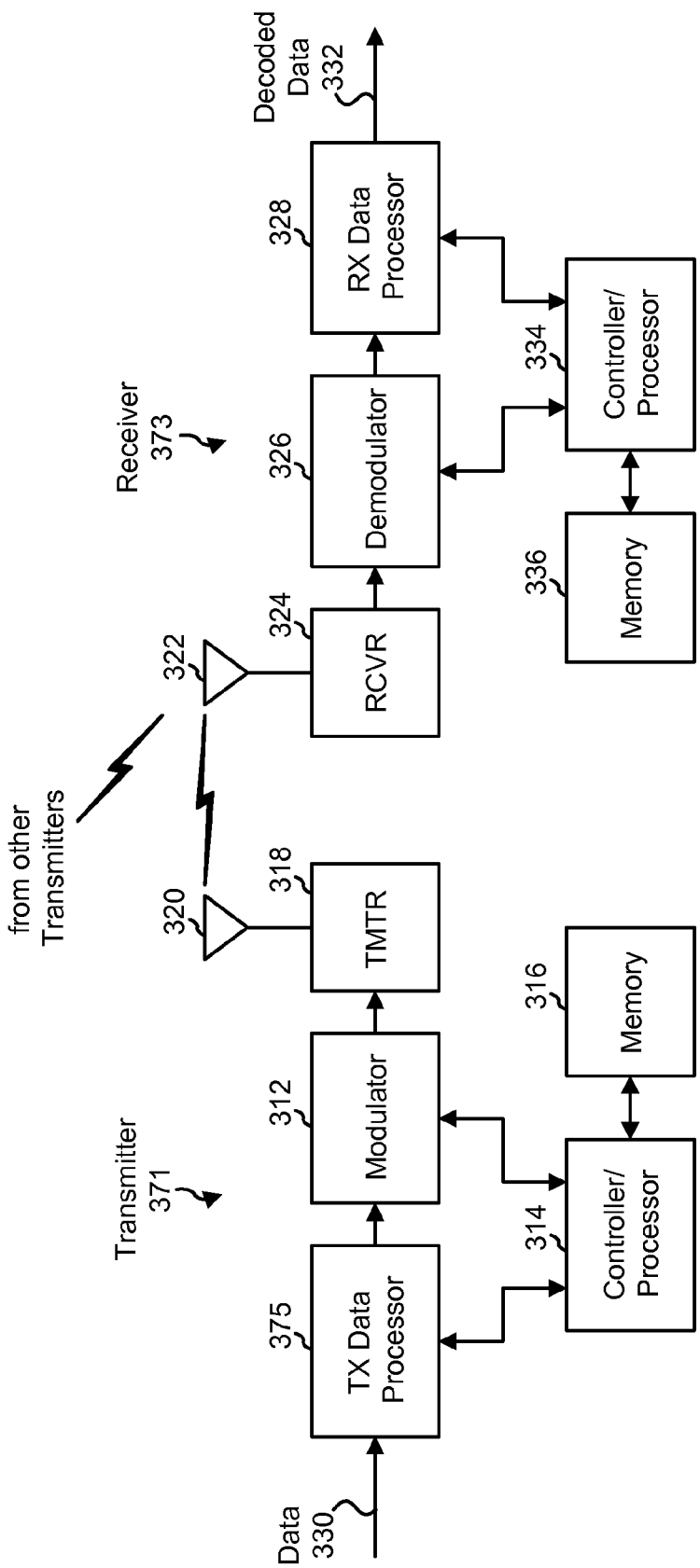
FIG. 7 shows a block diagram of a transmitter and a receiver in a wireless communication system according to some embodiments.

FIG. 7 shows a block diagram of a transmitter 371 and a receiver 373 in a wireless communication system according to some embodiments. For the downlink 129, the transmitter 371 may be part of a base station 102 and the receiver 373 may be part of a wireless communication device 104. For the uplink 127, the transmitter 371 may be part of a wireless communication device 104 and the receiver 373 may be part of a base station 102.

At the transmitter 371, a transmit (TX) data processor 375 receives and processes (e.g., formats, encodes, and interleaves) data 330 and provides coded data. A modulator 312 performs modulation on the coded data and provides a modulated signal. The modulator 312 may perform Gaussian minimum shift keying (GMSK) for GSM, 8-ary phase shift keying (8-PSK) for Enhanced Data rates for Global Evolution (EDGE), etc. GMSK is a continuous phase modulation protocol whereas 8-PSK is a digital modulation protocol. A transmitter unit (TMTR) 318 conditions (e.g., filters, amplifies, and upconverts) the modulated signal and generates an RF modulated signal, which is transmitted via an antenna 320.

At the receiver 373, an antenna 322 receives RF modulated signals from the transmitter 371 and other transmitters. The antenna 322 provides a received RF signal to a receiver unit (RCVR) 324. The receiver unit 324 conditions (e.g., filters, amplifies, and downconverts) the received RF signal, digitizes the conditioned signal, and provides samples. A demodulator 326 processes the samples as described below and provides demodulated data. A receive (RX) data processor 328 processes (e.g., deinterleaves and decodes) the demodulated data and provides decoded data 332. In general, the processing by demodulator 326 and RX data processor 328 is complementary to the processing by the modulator 312 and the TX data processor 375, respectively, at the transmitter 371.

Controllers/processors 314 and 334 direct operation at the transmitter 371 and receiver 373, respectively. Memories 316 and 336 store program codes in the form of computer software and data used by the transmitter 371 and receiver 373, respectively.

Figure 8:
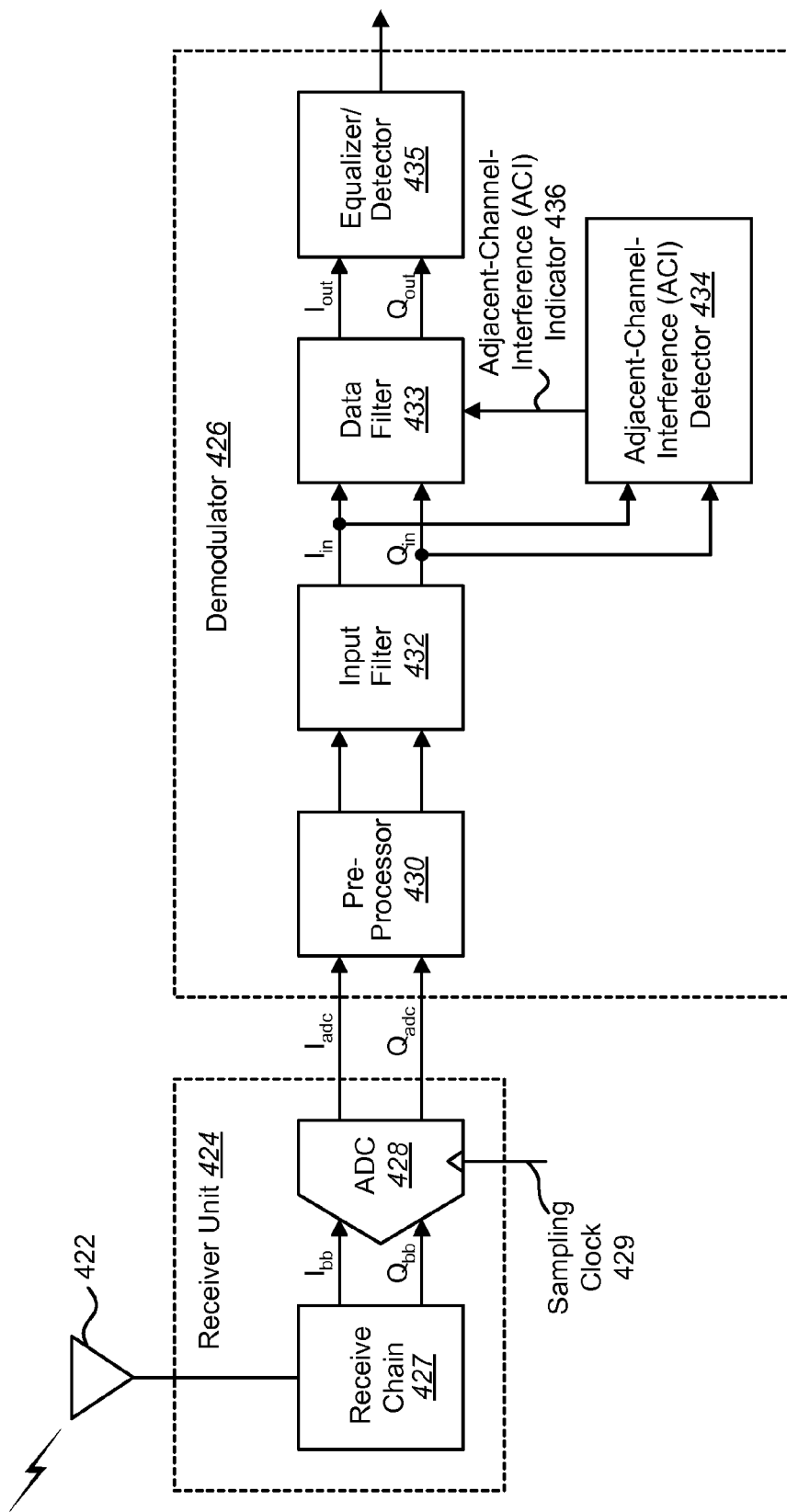
FIG. 8 shows a block diagram of a design of a receiver unit and demodulator at a receiver according to some embodiments.

FIG. 8 shows a block diagram of a design of a receiver unit 424 and a demodulator 426 at a receiver 373 according to some embodiments. An antenna 422 may be coupled to the receiver unit 424. Within the receiver unit 424, a receive chain 427 processes the received RF signal and provides I (inphase) and Q (quadrature) baseband signals, which are denoted as $I_{bb}$ and $Q_{bb}$. The receive chain 427 may perform low noise amplification, analog filtering, quadrature down-conversion, etc. as desired or needed. An analog-to-digital converter (ADC) 428 digitalizes the I and Q baseband signals at a sampling rate of $f_{adc}$ from a sampling clock 429 and provides I and Q samples, which are denoted as $I_{adc}$ and $Q_{adc}$. In general, the ADC sampling rate $f_{adc}$ may be related to the symbol rate $f_{sym}$ by any integer or non-integer factor.

Within the demodulator 426, a pre-processor 430 performs pre-processing on the I and Q samples from the analog-to-digital converter (ADC) 428. For example, the pre-processor 430 may remove direct current (DC) offset, remove frequency offset, etc. An input filter 432 filters the samples from the pre-processor 430 based on a particular frequency response and provides input I and Q samples, which are denoted as $I_{in}$ and $Q_{in}$. The input filter 432 may filter the I and Q samples to suppress images resulting from the sampling by the analog-to-digital converter (ADC) 428 as well as jammers. The input filter 432 may also perform sample rate conversion, e.g., from 24× oversampling down to 2× oversampling. A data filter 433 filters the input I and Q samples from the input filter 432 based on another frequency response and provides output I and Q samples, which are denoted as $I_{out}$ and $Q_{out}$. The input filter 432 and the data filter 433 may be implemented with finite impulse response (FIR) filters, infinite impulse response (IIR) filters or filters of other types. The frequency responses of the input filter 432 and the data filter 433 may be selected to achieve good performance. In one design, the frequency response of the input filter 432 is fixed and the frequency response of the data filter 433 is configurable.

An adjacent-channel-interference (ACI) detector 434 receives the input I and Q samples from the input filter 432, detects for adjacent-channel-interference (ACI) in the received RF signal, and provides an adjacent-channel-interference (ACI) indicator 436 to the data filter 433. The adjacent-channel-interference (ACI) indicator 436 may indicate whether or not adjacent-channel-interference (ACI) is present and, if present, whether the adjacent-channel-interference (ACI) is due to the higher RF channel centered at +200 kilohertz (kHz) and/or the lower RF channel centered at −200 kHz. The frequency response of the data filter 433 may be adjusted based on the adjacent-channel-interference (ACI) indicator 436, to achieve desirable performance.

An equalizer/detector 435 receives the output I and Q samples from the data filter 433 and performs equalization, matched filtering, detection and/or other processing on these samples. For example, the equalizer/detector 435 may implement a maximum likelihood sequence estimator (MLSE) that determines a sequence of symbols that is most likely to have been transmitted given a sequence of I and Q samples and a channel estimate.

Figure 9:
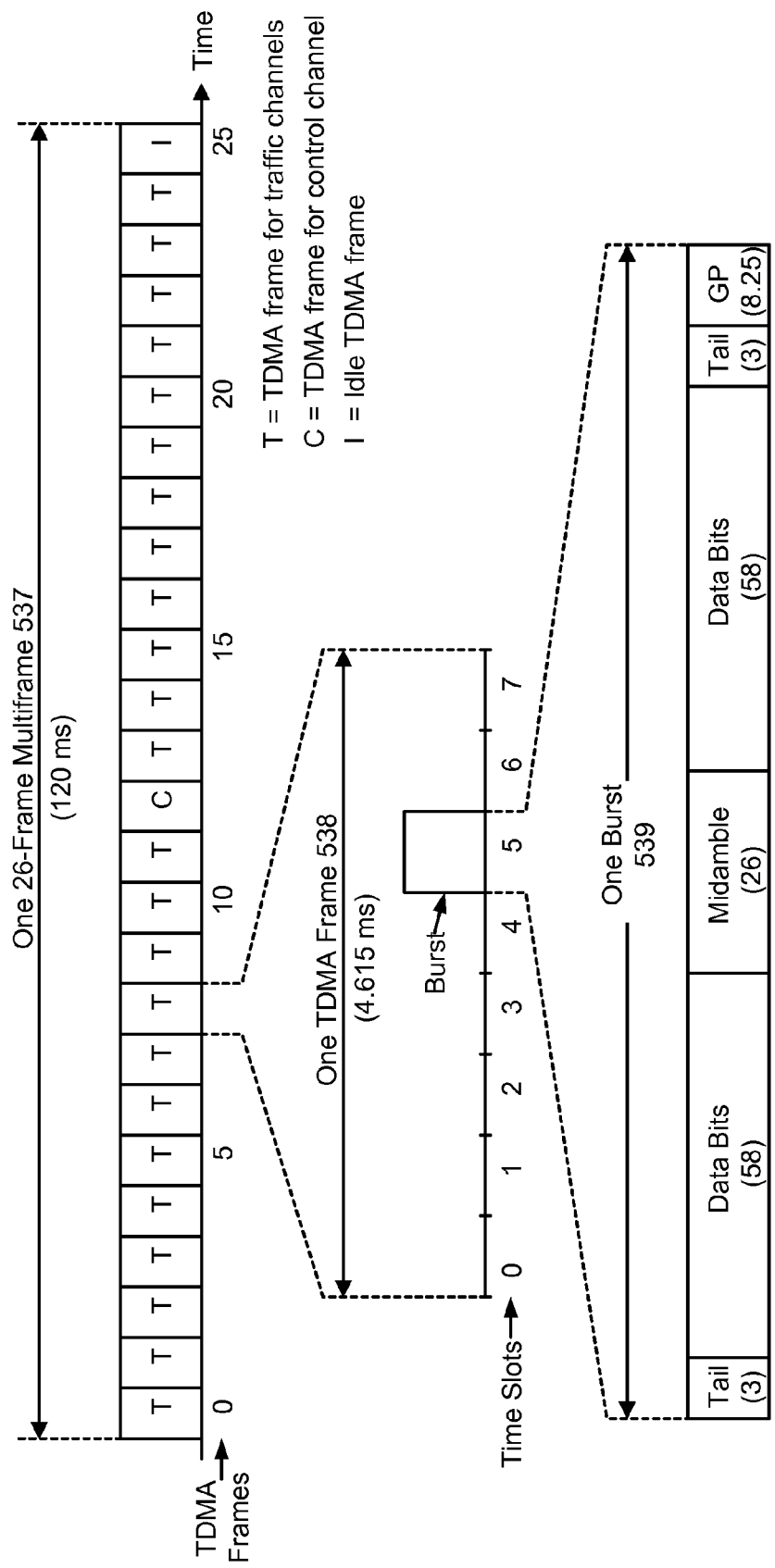
FIG. 9 shows example frame and burst formats in GSM according to some embodiments.

FIG. 9 shows example frame and burst formats in GSM according to some embodiments. The timeline for transmission is divided into multiframes 537. For traffic channels used to transmit user-specific data, each multiframe 537 in this example includes 26 TDMA frames 538, which are labeled as TDMA frames 0 through 25. The traffic channels are sent in TDMA frames 0 through 11 and TDMA frames 13 through 24 of each multiframe 537. A control channel is sent in TDMA frame 12. No data is sent in idle TDMA frame 25, which is used by the wireless communication devices 104 to make measurements of signals transmitted by neighbor base stations 102.

Each time slot within a frame is also referred to as a "burst" 539 in GSM. Each burst 539 includes two tail fields, two data fields, a training sequence (or midamble) field and a guard period (GP). The number of symbols in each field is shown inside the parentheses. A burst 539 includes symbols for the tail, data, and midamble fields. No symbols are sent in the guard period. TDMA frames of a particular carrier frequency are numbered and formed in groups of 26 or 51 TDMA frames 538 called multiframes 537.

Also, each base station 102 is assigned one or more carrier frequencies. Each carrier frequency is divided into eight time slots (which are labeled as time slots 0 through 7) using TDMA such that eight consecutive time slots form one TDMA frame 538 with a duration of 4.615 milliseconds (ms). A physical channel occupies one time slot within a TDMA frame 538. Each active wireless communication device 104 or user is assigned one or more time slot indices for the duration of a call. User-specific data for each wireless communication device 104 is sent in the time slot(s) assigned to that wireless communication device 104 and in TDMA frames 538 used for the traffic channels.

Figure 10:
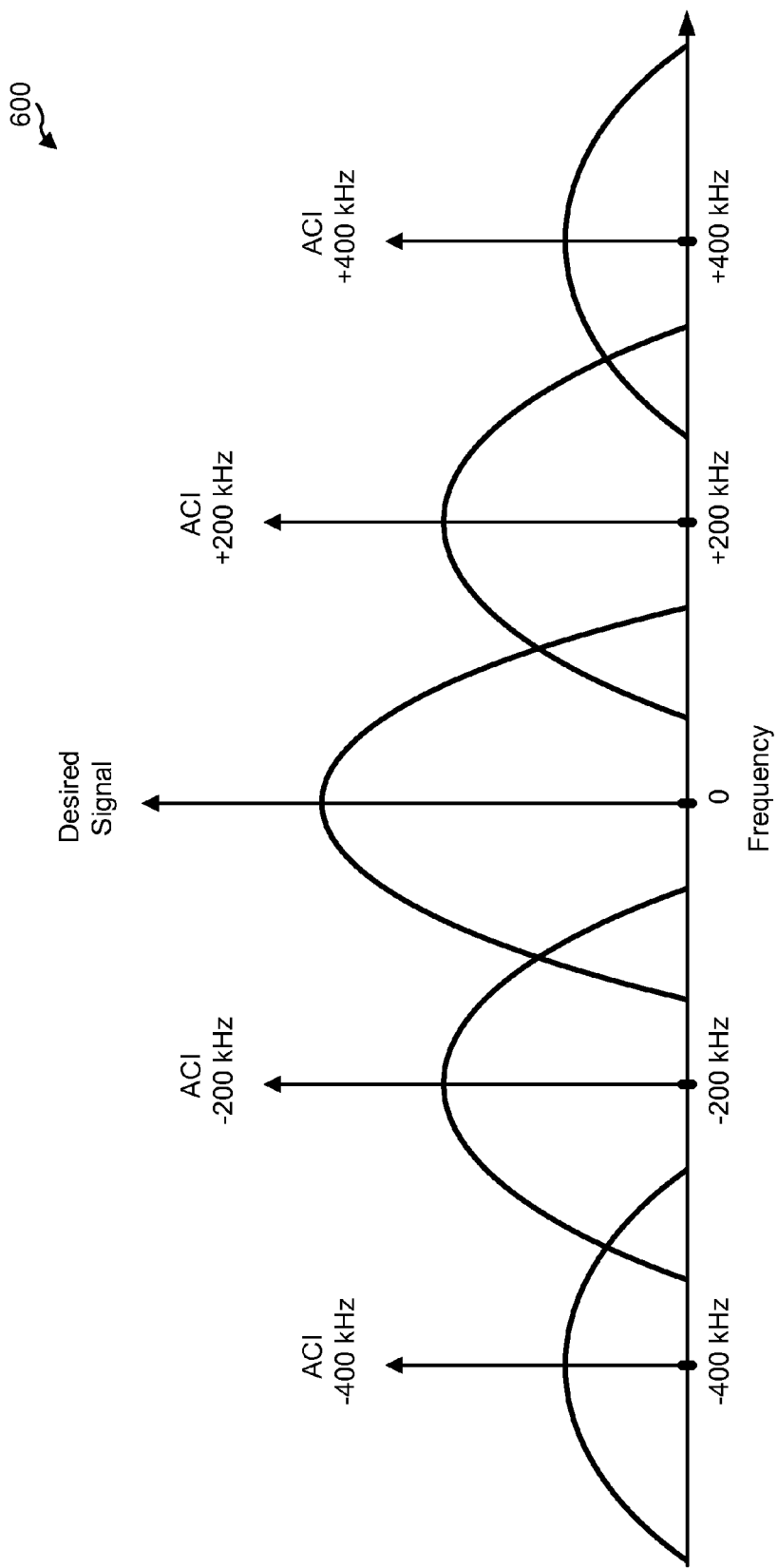
FIG. 10 shows an example spectrum in a GSM system according to some embodiments.

FIG. 10 shows an example spectrum 600 in a GSM system according to some embodiments. In this example, five RF modulated signals are transmitted on five RF channels that are spaced apart by 200 kHz. The RF channel of interest is shown with a center frequency of 0 Hz. The two adjacent RF channels have center frequencies that are +200 kHz and −200 kHz from the center frequency of the desired RF channel. The next two nearest RF channels (which are referred to as blockers or non-adjacent RF channels) have center frequencies that are +400 kHz and −400 kHz from the center frequency of the desired RF channel. There may be other RF channels in the spectrum 600, which are not shown in FIG. 10 for simplicity. In GSM, an RF modulated signal is generated with a symbol rate of $f_{sym}=13000/48=270.8$ kilo symbols/second (ksps) and has a −3 decibel (dB) bandwidth of up to 135 kHz. The RF modulated signals on adjacent RF channels may thus overlap one another at the edges, as shown in FIG. 10.

In GSM/EDGE, frequency bursts (FB) are sent regularly by the base station 102. This allows wireless communication devices 104 to synchronize their local oscillator (LO) to the base station 102 local oscillator (LO) using frequency offset estimation and correction. These bursts comprise a single tone, which corresponds to all "0" payload and training sequence. The all zero payload of the frequency burst is a constant frequency signal, or a single tone burst. When in acquisition, the wireless communication device 104 hunts continuously for a frequency burst from a list of carriers. Upon detecting a frequency burst, the wireless communication device 104 will estimate the frequency offset relative to its nominal frequency, which is 67.7 kHz from the carrier. The wireless communication device 104 local oscillator (LO) will be corrected using this estimated frequency offset. In power up mode, the frequency offset can be as much as +/−19 kHz. The wireless communication device 104 will periodically wakeup to monitor the frequency burst to maintain its synchronization in standby mode. In the standby mode, the frequency offset is within ±2 kHz.

One or more modulation schemes are used in GERAN systems to communicate information such as voice, data, and/or control information. Examples of the modulation schemes may include GMSK (Gaussian Minimum Shift Keying), M-ary QAM (Quadrature Amplitude Modulation) or M-ary PSK (Phase Shift Keying), where $M=2^n$, with n being the number of bits encoded within a symbol period for a specified modulation scheme. GMSK is a constant envelope binary modulation scheme allowing raw transmission at a maximum rate of 270.83 kilobits per second (Kbps).

General Packet Radio Service (GPRS) is a non-voice service. It allows information to be sent and received across a mobile telephone network. It supplements Circuit Switched Data (CSD) and Short Message Service (SMS). GPRS employs the same modulation schemes as GSM. GPRS allows for an entire frame (all eight time slots) to be used by a single mobile station at the same time. Thus, higher data throughput rates are achievable.

The EDGE standard uses both the GMSK modulation and 8-PSK modulation. Also, the modulation type can be changed from burst to burst. 8-PSK modulation in EDGE is a linear, 8-level phase modulation with $3\pi/8$ rotation, while GMSK is a non-linear, Gaussian-pulse-shaped frequency modulation. However, the specific GMSK modulation used in GSM can be approximated with a linear modulation (i.e., 2-level phase modulation with a $\pi/2$ rotation). The symbol pulse of the approximated GSMK and the symbol pulse of 8-PSK are identical. The EGPRS2 standard uses GMSK, QPSK, 8-PSK, 16-QAM and 32-QAM modulations. The modulation type can be changed from burst to burst. Q-PSK, 8-PSK, 16-QAM and 32-QAM modulations in EGPRS2 are linear, 4-level, 8-level, 16-level and 32-level phase modulations with $3\pi/4$, $3\pi/8$, $\pi/4$, $-\pi/4$ rotation, while GMSK is a non-linear, Gaussian-pulse-shaped frequency modulation. However, the specific GMSK modulation used in GSM can be approximated with a linear modulation (i.e., 2-level phase modulation with a $\pi/2$ rotation). The symbol pulse of the approximated GSMK and the symbol pulse of 8-PSK are identical. The symbol pulse of Q-PSK, 16-QAM and 32-QAM can use spectrally narrow or wide pulse shapes.

Figure 11:
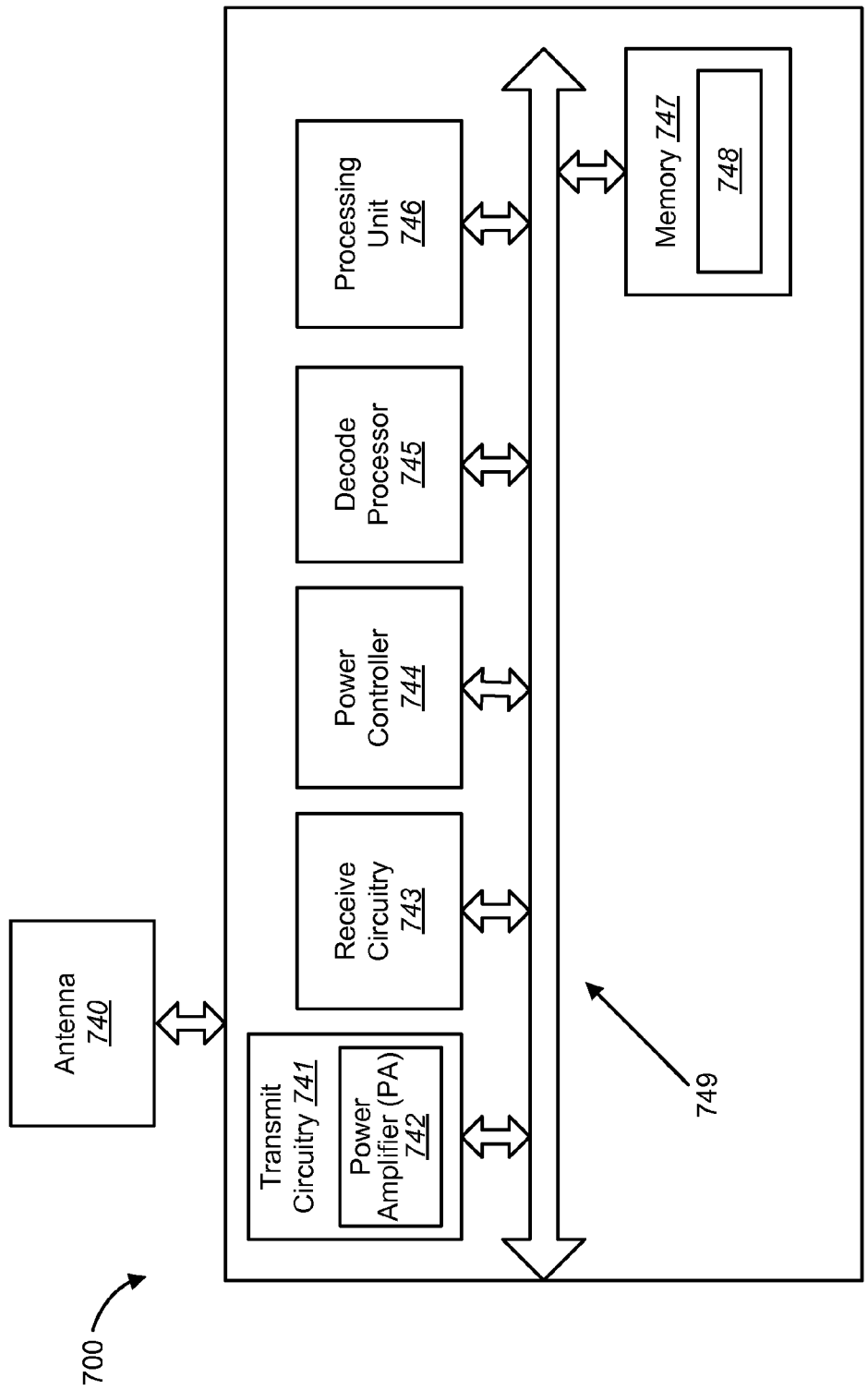
FIG. 11 illustrates an example of a wireless device that includes transmit circuitry (including a power amplifier), receive circuitry, a power controller, a decode processor, a processing unit for use in processing signals and memory according to some embodiments.

FIG. 11 illustrates an example of a wireless device 700 that includes transmit circuitry 741 (including a power amplifier 742), receive circuitry 743, a power controller 744, a decode processor 745, a processing unit 746 for use in processing signals and memory 747 according to some embodiments. The wireless device 700 may be a base station 102 or a wireless communication device 104. The transmit circuitry 741 and the receive circuitry 743 may allow transmission and reception of data, such as audio communications, between the wireless device 700 and a remote location. The transmit circuitry 741 and receive circuitry 743 may be coupled to an antenna 740.

The processing unit 746 controls operation of the wireless device 700. The processing unit 746 may also be referred to as a central processing unit (CPU). Memory 747, which may include both read-only memory (ROM) and random access memory (RAM), provides instructions and data to the processing unit 746. A portion of the memory 747 may also include non-volatile random access memory (NVRAM).

The various components of the wireless device 700 are coupled together by a bus system 749 which may include a power bus, a control signal bus, and a status signal bus in addition to a data bus. For the sake of clarity, the various busses are illustrated in FIG. 11 as the bus system 749.

The steps of the methods discussed may also be stored as instructions in the form of software or firmware located in memory 747 in a wireless device 700. These instructions may be executed by the controller/processor(s) 210 of the wireless device 700. Alternatively, or in conjunction, the steps of the methods discussed may be stored as instructions in the form of software or firmware 748 located in memory 747 in the wireless device 700. These instructions may be executed by the processing unit 746 of the wireless device 700 in FIG. 11.

Figure 12:
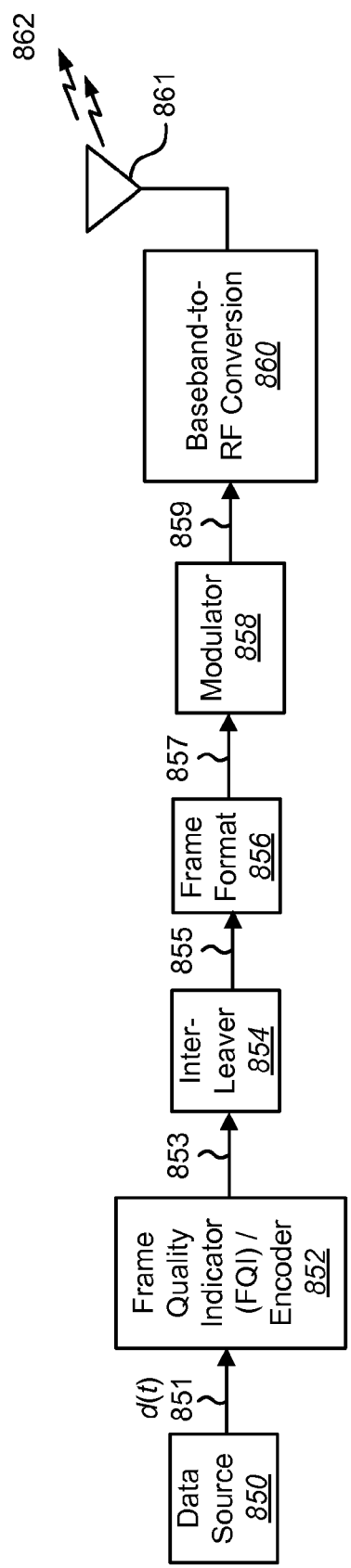
FIG. 12 illustrates an example of a transmitter structure and/or process according to some embodiments.

FIG. 12 illustrates an example of a transmitter structure and/or process according to some embodiments. The transmitter structure and/or process of FIG. 12 may be implemented in a wireless device such as a wireless communication device 104 or a base station 102. The functions and components shown in FIG. 12 may be implemented by software, hardware or a combination of software and hardware. Other functions may be added to FIG. 12 in addition to or instead of the functions shown.

In FIG. 12, a data source 850 provides data d(t) 851 to a frame quality indicator (FQI)/encoder 852. The frame quality indicator (FQI)/encoder 852 may append a frame quality indicator (FQI) such as a cyclic redundancy check (CRC) to the data d(t) 851. The frame quality indicator (FQI)/encoder 852 may further encode the data and frame quality indicator (FQI) using one or more coding schemes to provide encoded symbols 853. Each coding scheme may include one or more types of coding, e.g., convolutional coding, Turbo coding, block coding, repetition coding, other types of coding or no coding at all. Other coding schemes may include automatic repeat request (ARQ), hybrid ARQ (H-ARQ) and incremental redundancy repeat techniques. Different types of data may be encoded with different coding schemes.

An interleaver 854 interleaves the encoded data symbols 853 in time to combat fading and generates symbols 855. The interleaved symbols 855 may be mapped by a frame format block 856 to a pre-defined frame format to produce a frame 857. In an example, a frame format block 856 may specify the frame 857 as being composed of a plurality of sub-segments. Sub-segments may be any successive portions of a frame 857 along a given dimension, e.g., time, frequency, code or any other dimension. A frame 857 may be composed of a fixed plurality of such sub-segments, each sub-segment containing a portion of the total number of symbols allocated to the frame. In one example, the interleaved symbols 855 are segmented into a plurality S of sub-segments making up a frame 857.

A frame format block 856 may further specify the inclusion of, e.g., control symbols (not shown) along with the interleaved symbols 855. Such control symbols may include, e.g., power control symbols, frame format information symbols, etc.

A modulator 858 modulates the frame 857 to generate modulated data 859. Examples of modulation techniques include binary phase shift keying (BPSK) and quadrature phase shift keying (QPSK). The modulator 858 may also repeat a sequence of modulated data 859.

A baseband-to-radio-frequency (RF) conversion block 860 may convert the modulated data 859 to RF signals for transmission via an antenna 861 as a signal 862 over a wireless communication link to one or more wireless device receivers.

Figure 13:
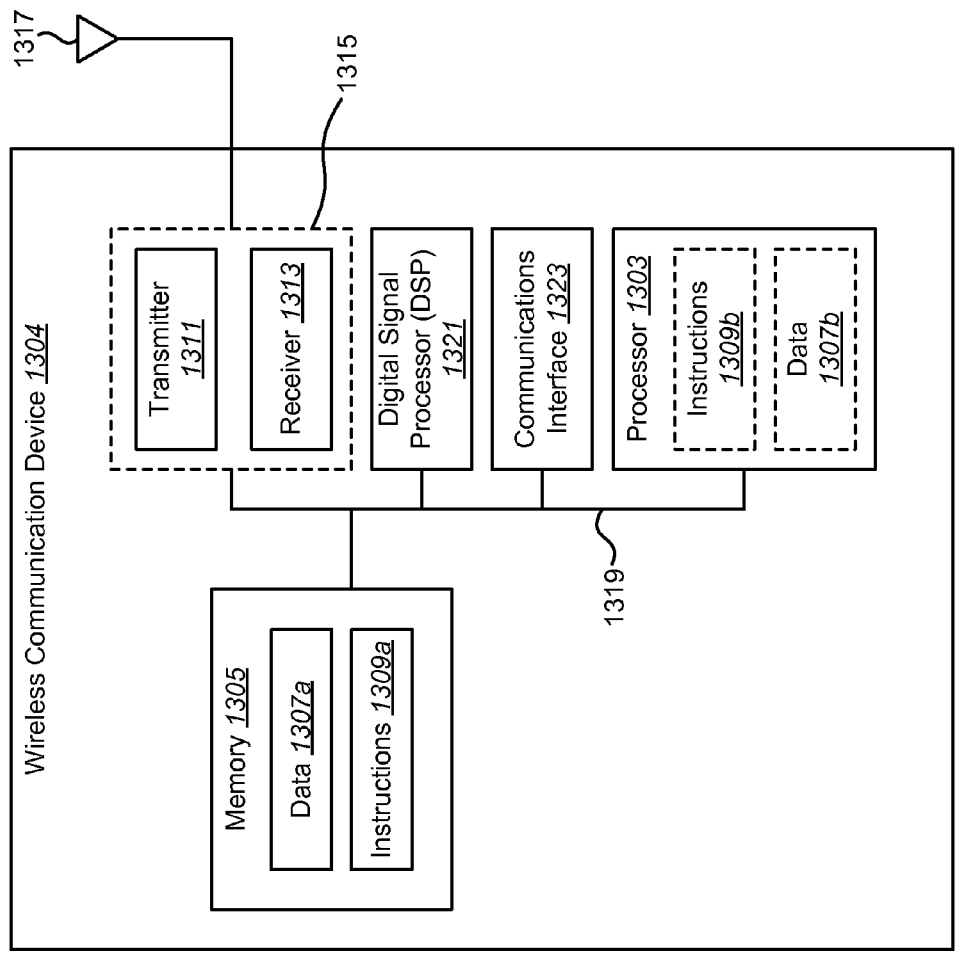
FIG. 13 illustrates certain components that may be included within a wireless communication device according to some embodiments.

FIG. 13 illustrates certain components that may be included within a wireless communication device 1304 according to some embodiments. The wireless communication device 1304 may be an access terminal, a mobile station, a user equipment (UE), etc. The wireless communication device 1304 includes a processor 1303. The processor 1303 may be a general purpose single- or multi-chip microprocessor (e.g., an ARM), a special purpose microprocessor (e.g., a digital signal processor (DSP)), a microcontroller, a programmable gate array, etc. The processor 1303 may be referred to as a central processing unit (CPU). Although just a single processor 1303 is shown in the wireless communication device 1304 of FIG. 13, in an alternative configuration, a combination of processors (e.g., an ARM and DSP) could be used.

The wireless communication device 1304 also includes memory 1305. The memory 1305 may be any electronic component capable of storing electronic information. The memory 1305 may be embodied as random access memory (RAM), read-only memory (ROM), magnetic disk storage media, optical storage media, flash memory devices in RAM, on-board memory included with the processor, EPROM memory, EEPROM memory, registers and so forth, including combinations thereof.

Data 1307a and instructions 1309a may be stored in the memory 1305. The instructions 1309a may be executable by the processor 1303 to implement the methods disclosed herein. Executing the instructions 1309a may involve the use of the data 1307a that is stored in the memory 1305. When the processor 1303 executes the instructions 1309, various portions of the instructions 1309b may be loaded onto the processor 1303, and various pieces of data 1307b may be loaded onto the processor 1303.

The wireless communication device 1304 may also include a transmitter 1311 and a receiver 1313 to allow transmission and reception of signals to and from the wireless communication device 1304 via an antenna 1317. The transmitter 1311 and receiver 1313 may be collectively referred to as a transceiver 1315. The wireless communication device 1304 may also include (not shown) multiple transmitters, multiple antennas, multiple receivers and/or multiple transceivers.

The wireless communication device 1304 may include a digital signal processor (DSP) 1321. The wireless communication device 1304 may also include a communications interface 1323. The communications interface 1323 may allow a user to interact with the wireless communication device 1304.

The various components of the wireless communication device 1304 may be coupled together by one or more buses, which may include a power bus, a control signal bus, a status signal bus, a data bus, etc. For the sake of clarity, the various buses are illustrated in FIG. 13 as a bus system 1319.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IF-DMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 2 and 3, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized. For example, some of the methods described herein may be performed by a processor 1303 and or more local oscillators (LOs), a wideband receiver 119 and fast Fourier transform (FFT) hardware 121, software and/or firmware.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for wireless communication, comprising:
    beginning an acquisition;
    performing multiple scans in parallel using multiple local oscillators of absolute radio frequency channel numbers for supported Global System for Mobile communication (GSM) bands using a wideband receiver, wherein at least one local oscillator is used to perform scans of absolute radio frequency channel numbers;

identifying, using a fast Fourier transform, the absolute radio frequency channel numbers that comprise a frequency correction channel; and decoding a synchronization channel using data corresponding to the frequency correction channels.

2. The method of claim 1, wherein the method is performed by a multi-mode wireless communication device.

3. The method of claim 1, wherein performing the multiple scans in parallel comprises scanning at least two bands corresponding to different radio access technologies in parallel.

4. The method of claim 1, wherein the supported GSM bands comprise one or more of an EGSM band, a GSM-850 band, a personal communications service band, a digital cellular service band, a PGSM band, an RGSM band, a GSM 450 band, a GSM 480 band, a GSM 700 band and a T-GSM810 band.

5. The method of claim 1, further comprising acquiring a serving cell using the synchronization channel.

6. The method of claim 1, wherein the wideband receiver is a Long Term Evolution wideband receiver.

7. The method of claim 1, wherein the wideband receiver is a wireless fidelity wideband receiver.

8. The method of claim 1, wherein the wideband receiver is a wideband channel division multiple access wideband receiver.

9. The method of claim 1, further comprising obtaining a received signal strength indication of a broadcast control channel for each absolute radio frequency channel number using the frequency correction channels.

10. The method of claim 1, further comprising obtaining a time of the synchronization channel for each absolute radio frequency channel number using data of a known period away from the frequency correction channels in the same wideband scanning data.

11. The method of claim 1, further comprising sorting the frequency correction channels according to received signal strength indication, wherein the synchronization channel corresponding to the absolute radio frequency channel number that comprises the frequency correction channel with a highest received signal strength indication is decoded first.

12. The method of claim 11, further comprising:
putting a right section of captured in-phase and quadrature data of a selected absolute radio frequency channel number to normal format of a baseband signal of a synchronization channel; and
applying a narrowband filter to obtain a clean synchronization signal.

13. The method of claim 1, wherein the scan is performed across supported GSM bands for multiple radio access technologies.

14. The method of claim 1, wherein at least one local oscillator is configured to cover a band while minimizing overlap with other bands.

15. An apparatus for wireless communication, comprising:
a processor;
memory in electronic communication with the processor; and
instructions stored in the memory, the instructions being executable by the processor to:
begin an acquisition;
perform multiple scans in parallel using multiple local oscillators of absolute radio frequency channel numbers for supported Global System for Mobile communication (GSM) bands using a wideband receiver, wherein at least one local oscillator is used to perform scans of absolute radio frequency channel numbers;
identify, using a fast Fourier transform, the absolute radio frequency channel numbers that comprise a frequency correction channel; and
decode a synchronization channel using data corresponding to the frequency correction channels.

16. The apparatus of claim 15, wherein the apparatus is a multi-mode wireless communication device.

17. The apparatus of claim 15, wherein performing the multiple scans in parallel comprises scanning at least two bands corresponding to different radio access technologies in parallel.

18. The apparatus of claim 15, wherein the supported GSM bands comprise one or more of an EGSM band, a GSM-850 band, a personal communications service band, a digital cellular service band, a PGSM band, an RGSM band, a GSM 450 band, a GSM 480 band, a GSM 700 band and a T-GSM810 band.

19. The apparatus of claim 15, wherein the instructions are further executable to acquire a serving cell using the synchronization channel.

20. The apparatus of claim 15, wherein the wideband receiver is a Long Term Evolution wideband receiver.

21. The apparatus of claim 15, wherein the wideband receiver is a wireless fidelity wideband receiver.

22. The apparatus of claim 15, wherein the wideband receiver is a wideband channel division multiple access wideband receiver.

23. The apparatus of claim 15, wherein the instructions are further executable to obtain a received signal strength indication of a broadcast control channel for each absolute radio frequency channel number using the frequency correction channels.

24. The apparatus of claim 15, wherein the instructions are further executable to obtain a time of the synchronization channel for each absolute radio frequency channel number using data a known period away from the frequency correction channels in the same wideband scanning data.

25. The apparatus of claim 15, wherein the instructions are further executable to sort the frequency correction channels according to received signal strength indication, wherein the synchronization channel corresponding to the absolute radio frequency channel number that comprises the frequency correction channel with a highest received signal strength indication is decoded first.

26. The apparatus of claim 25, wherein the instructions are further executable to:
put a right section of captured in-phase and quadrature data of a selected absolute radio frequency channel number to normal format of a baseband signal of a synchronization channel; and
apply a narrowband filter to obtain a clean synchronization signal.

27. The apparatus of claim 15, wherein the scan is performed across supported GSM bands for multiple radio access technologies.

28. A non-transitory computer-readable medium having instructions thereon, the instructions comprising:
code for causing a wireless communication device to begin an acquisition;
code for causing the wireless communication device to perform multiple scans in parallel using multiple local oscillators of absolute radio frequency channel numbers for supported Global System for Mobile communication (GSM) bands using a wideband receiver, wherein at least one local oscillator is used to perform scans of absolute radio frequency channel numbers;

code for causing the wireless communication device to identify, using a fast Fourier transform, the absolute radio frequency channel numbers that comprise a frequency correction channel; and code for causing the wireless communication device to decode a synchronization channel using data corresponding to the frequency correction channels.

29. The non-transitory computer-readable medium of claim 28, wherein the wireless communication device is a multi-mode wireless communication device.

30. The non-transitory computer-readable medium of claim 28, wherein the supported GSM bands comprise one or more of an EGSM band, a GSM-850 band, a personal communications service band, a digital cellular service band, a PGSM band, an RGSM band, a GSM 450 band, a GSM 480 band, a GSM 700 band and a T-GSM810 band.

* * * * *